(12) United States Patent
Chan

(10) Patent No.: US 10,289,160 B2
(45) Date of Patent: May 14, 2019

(54) INTEGRATED INTELLIGENT HEAD-MOUNTED DEVICE

(71) Applicant: Beeinventor Limited, Hong Kong (CN)

(72) Inventor: Kin Yung Chan, Hong Kong (CN)

(73) Assignee: BEEINVENTOR LIMITED, New Territories (HK)

( * ) Notice: Subject to any disclaimer, the term of this patent is extended or adjusted under 35 U.S.C. 154(b) by 0 days.

(21) Appl. No.: 15/691,012

(22) Filed: Aug. 30, 2017

(65) Prior Publication Data

US 2018/0164849 A1 Jun. 14, 2018

(30) Foreign Application Priority Data

Dec. 9, 2016 (CN) .................. 2016 2 1345568 U

(51) Int. Cl.
| | |
|---|---|
| *G06F 1/16* | (2006.01) |
| *G06F 3/16* | (2006.01) |
| *H01M 10/46* | (2006.01) |
| *H04N 5/225* | (2006.01) |
| *H01M 10/48* | (2006.01) |

(52) U.S. Cl.
CPC ............... *G06F 1/163* (2013.01); *G06F 3/16* (2013.01); *H01M 10/46* (2013.01); *H04N 5/2251* (2013.01); *H04N 5/2253* (2013.01); *G06F 1/1686* (2013.01); *G06F 1/1688* (2013.01); *G06F 1/1698* (2013.01); *H01M 10/486* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 4,199,802 A | * | 4/1980 | Malm | A42B 3/044 362/105 |
| 6,606,114 B1 | * | 8/2003 | Gordon | A42B 3/042 348/164 |
| 6,892,393 B1 | * | 5/2005 | Provost | A42B 3/185 2/10 |
| 8,529,082 B1 | * | 9/2013 | Baker | F21V 33/0076 362/105 |
| D742,049 S | * | 10/2015 | Baker | D26/39 |
| 2006/0277666 A1 | * | 12/2006 | Gertsch | A42B 3/04 2/424 |

(Continued)

*Primary Examiner* — Courtney L Smith
*Assistant Examiner* — Rashen E Morrison
(74) *Attorney, Agent, or Firm* — Muncy, Geissler, Olds & Lowe, P.C.

(57) ABSTRACT

The present invention provides an integrated intelligent head-mounted device comprising a frame mounted on a helmet in a detachable manner, on which a control circuit, a safety detection sensor, a loudspeaker, a microphone and a power supply are disposed or mounted. The integrated intelligent head-mounted device further comprises a health detection sensor disposed inside the helmet. The control circuit is provided with a wireless communication module and a positioning module and electrically connected to the health detection sensor, the video camera, the safety detection sensor, the loudspeaker, the microphone and the power supply. The device can be easily mounted and dismounted on a safety helmet and can monitor the physical condition and ambient condition of the wearer in real time.

19 Claims, 11 Drawing Sheets

(56) References Cited

U.S. PATENT DOCUMENTS

| | | | | |
|---|---|---|---|---|
| 2007/0106172 A1* | 5/2007 | Abreu | ............... | A61B 5/0002 |
| | | | | 600/549 |
| 2007/0261153 A1* | 11/2007 | Wise | ............... | A42B 3/044 |
| | | | | 2/423 |
| 2009/0073679 A1* | 3/2009 | Wainright | ............... | A42B 3/044 |
| | | | | 362/191 |
| 2009/0235437 A1* | 9/2009 | Springer | ............... | A42B 3/185 |
| | | | | 2/422 |
| 2012/0287284 A1* | 11/2012 | Jacobsen | ............... | G06F 1/163 |
| | | | | 348/158 |
| 2013/0215281 A1* | 8/2013 | Hobby | ............... | G06F 3/005 |
| | | | | 348/207.1 |
| 2015/0032021 A1* | 1/2015 | Chen | ............... | A61B 5/7275 |
| | | | | 600/544 |
| 2015/0115803 A1* | 4/2015 | Mackool | ............... | H05B 33/0803 |
| | | | | 315/152 |
| 2018/0092427 A1* | 4/2018 | Jacobsen | ............... | A42B 3/185 |
| 2018/0109930 A1* | 4/2018 | Kim | ............... | H04B 1/3827 |

* cited by examiner

INTEGRATED INTELLIGENT HEAD-MOUNTED DEVICE

TECHNICAL FIELD OF THE INVENTION

The present invention relates to the field of intelligent devices, particularly to an integrated intelligent head-mounted device that can be mounted to an existing cap.

BACKGROUND OF THE INVENTION

All the time, the construction industry hasn't provided portable electronic devices for construction workers to protect their occupational safety and health in real time. On construction sites, construction workers must wear safety helmets to assure construction safety. Current safety helmets mostly are made of hard plastic material, which can alleviate head injury in case an object falls. Moreover, once a worker falls, the safety helmet he wears can protect his head.

Current safety helmets only play a role in protecting heads and are not integrated with any intelligent devices, such as sensors and electronic elements. In order to better protect the personal safety of construction workers, sensors or electronic elements need to be installed inside safety helmets to detect the safety of the construction workers and surrounding environment and warn on the construction workers in time in case of a danger. In this way, the safety helmets not only protect the heads of construction workers but also may send warning information when the safety and health of construction workers are being threatened. These safety helmets may be perfect platforms equipped with video devices, audio devices and sensors and used in daily working activities, thereby turning outmoded devices into intelligent devices and also filling in the gap of the construction industry.

However, the construction industry is relatively conservative and reluctant to accept new things. Under this circumstance, if we redesign the current safety helmets into devices with embedded sensors and communication modules, construction workers may not accept such safety helmets and will not be willing to wear them. Moreover, the production cost of a safety helmet integrated with intelligent devices is much higher than that of an ordinary safety helmet and construction companies may not accept it.

Furthermore, in the construction industry, workers frequently change their workplace, safety helmets are private articles and workers are reluctant to use the safety helmets that have been used by other people, so this will cause huge waste. Construction companies and engineering companies are unwilling to buy expensive devices that cannot be shared by workers. Therefore, it is necessary to consider how to reduce the cost of the integrated devices of safety helmets and how to raise their mobility.

SUMMARY OF THE INVENTION

The main object of the present invention is to provide an integrated intelligent head-mounted device, which has low production cost and can be mounted on a current safety helmet in a detachable manner.

In order to realize the above object, the present invention provides an integrated intelligent head-mounted device, comprising a frame mounted on a helmet in a detachable manner, on which a control circuit, a safety detection sensor, a loudspeaker, a microphone and a power supply are disposed or mounted. The integrated intelligent head-mounted device further comprises a health detection sensor disposed inside the helmet. The control circuit is provided with a wireless communication module and a positioning module and electrically connected to the health detection sensor, the video camera, the safety detection sensor, the loudspeaker, the microphone and the power supply.

Preferably, the frame comprises an internal frame disposed inside a helmet and an external endless belt disposed outside the helmet, and the health detection sensor is disposed on a head band, which is arranged inside a helmet in advance; a first fastener is disposed on the external endless belt, a second fastener coordinating with the first fastener is disposed on the internal frame, and the internal frame and the external endless belt are connected to the second fastener in a fixed manner via the first fastener.

Further, one of the first fastener and the second fastener is an elastic buckle and the other is a jack.

In addition, the integrated intelligent head-mounted device further comprises a retaining ring, which is mounted outside it in a sleeved manner after the elastic buckle is coupled with the jack.

Further, a video camera is further disposed on the external endless belt, mounted on the external endless belt in a detachable manner and electrically connected to the control circuit.

Further, the external endless belt comprises an endless belt body and an integration module, which forms an integral body with the endless belt body or is fixed on the endless belt body in a detachable manner.

Further, at least one of inner microphone and loudspeaker is disposed on the integration module, and a vibrator is further disposed on the integration module and sends out vibration signals under the control of the signals outputted by the control circuit.

Further, a display device is mounted on the internal frame in a detachable manner and electrically connected to the control circuit; and comprises a holder and a display screen mounted on the holder. The holder comprises a first portion and a second portion, which are mutually rotatable. The first portion is fixed on the internal frame and the display screen is fixed on the second portion.

Further, the first portion comprises a sliding seat mounted on the internal frame and a sliding block that may slide relative to the sliding seat; the second portion is articulated with the sliding block.

Further, the power supply is mounted on the rear side of the internal frame and connected to the front side of the internal frame via a flexible conductor.

Further, the integrated intelligent head-mounted device is further provided with a battery temperature sensor, which is intended to detect the temperature of the power supply and output detection signals to the control circuit.

Further, a charging interface is disposed on the external endless belt and intended to charge the power supply.

Further, at least one control button is disposed on the external endless belt and electrically connected to the control circuit.

Optionally, the frame is an external endless belt disposed outside the helmet, and comprising at least one integration module; the control circuit, the power supply and the safety sensor are disposed inside the integration module, and a first flexible conductor is disposed inside the external endless belt and electrically connected to the control circuit.

Preferably, the ends of the external endless belt are coupled with each other to externally encircle the helmet; a containing chamber coordinating with the integration module is disposed on the external endless belt to contain the integration module.

Further, an elastic buckle is disposed on the external endless belt, passes through a jack disposed on the helmet, and then is locked by a retaining ring.

Further, a health detection sensor is mounted on the head band of the helmet; a power board is disposed on the elastic buckle, flexible wires may be coupled with the power board and electrically connected to the power board, and the head band is provided with a second flexible conductor, which is electrically connected to the flexible wires.

Further, the number of integration modules is two or more, including a first integration module and a second integration module, a video camera is disposed on the first integration module in a detachable manner, and a display device is mounted on the second integration module in a detachable manner.

As described above, the integrated intelligent head-mounted device provided by the present invention comprises an external endless belt mounted on a safety helmet in a detachable manner, so the wearer may install the integrated intelligent head-mounted device onto a safety helmet through simple assembly, and if needed, may dismount the integrated intelligent head-mounted device from the safety helmet and mount it onto another safety helmet. Further, various kinds of sensors and electronic elements are disposed on the integrated intelligent head-mounted device, for example: sensors detecting human health, such as: body temperature sensor and heart rate sensor, and sensors detecting if the working environment is safe, such as distance sensor and accelerometer sensor. From the information acquired by these sensors and video camera, it judges whether wearer's environment is safe, thereby sending warning to the wearer. As the cost of the foregoing sensors and video camera is not high, the production cost of the integrated intelligent head-mounted device is not high, either, making for the promotion and application of the integrated intelligent head-mounted device.

Moreover, the integrated intelligent head-mounted device may comprise an internal frame and an external endless belt, the mutual fixation between the internal frame and the external endless belt is realized by an elastic buckle and a jack, and the elastic buckle may be locked through a retaining ring after it is inserted into the jack. In this way, the fixation between the internal frame and the external endless belt is very simple and the operation is very convenient.

Further, for easy assembly of the external endless belt, the external endless belt may be designed to comprise an endless belt body and an integration module, and the microphone, loudspeaker, vibrator and other units are integrated on the integration module.

Further, for easy assembly of the display screen on the display device, the display screen is fixed on a holder, the holder is mounted to the front end of the internal frame by screws, a first portion and a second portion that are mutually rotatable are disposed on the holder, and the display screen is fixed on the second portion. In this way, the display screen may rotate relative to the internal frame and the wearer may flip up or down the display screen according to need and easily install and use the display screen.

Moreover, a sliding seat and a sliding block are disposed on the first portion, so the distance between the display screen and the internal frame may be adjusted, in other words, the display screen may slide with the sliding block relative to the sliding seat so that the wearer may adjust the position of the display screen according to actual need.

Besides, a battery temperature sensor intended to detect the temperature of the power supply is disposed inside the integrated intelligent head-mounted device. When the temperature of the power supply is excessively high, it will stop the power supply from supplying power to other elements, thereby avoiding exceptions otherwise caused by overheating of the battery, ensuring wearer's personal safety and also avoiding damage of the integrated intelligent device.

The present invention now will be further described by referring to the accompanying drawings and embodiments.

DETAILED DESCRIPTION OF THE INVENTION

The integrated intelligent head-mounted device provided by the present invention may be mounted on current safety helmets, of course may also be mounted on other caps, such as sun caps and motorcycle helmets.

Figure 1:
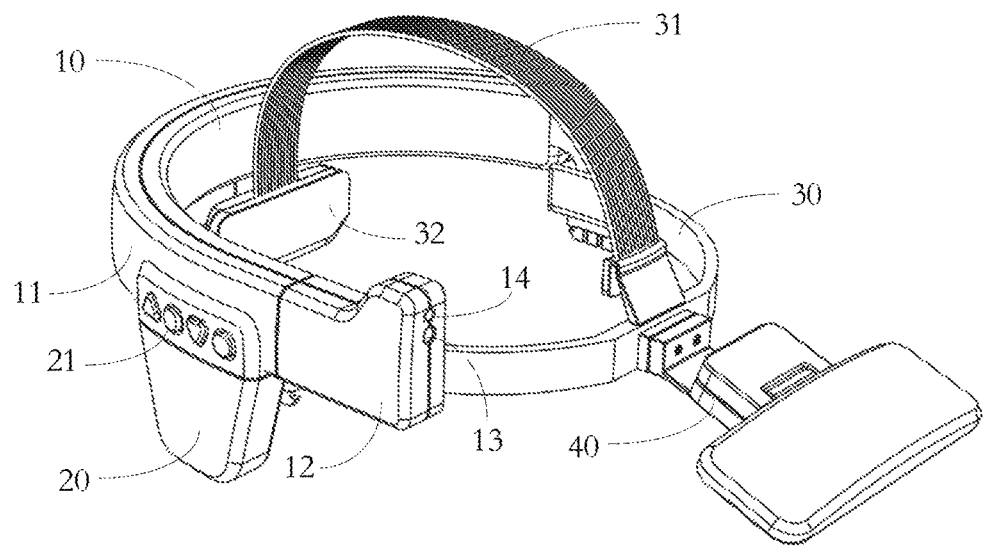
FIG. 1 is a schematic view of Embodiment 1 of the present invention at the first visual angle.
Figure 2:
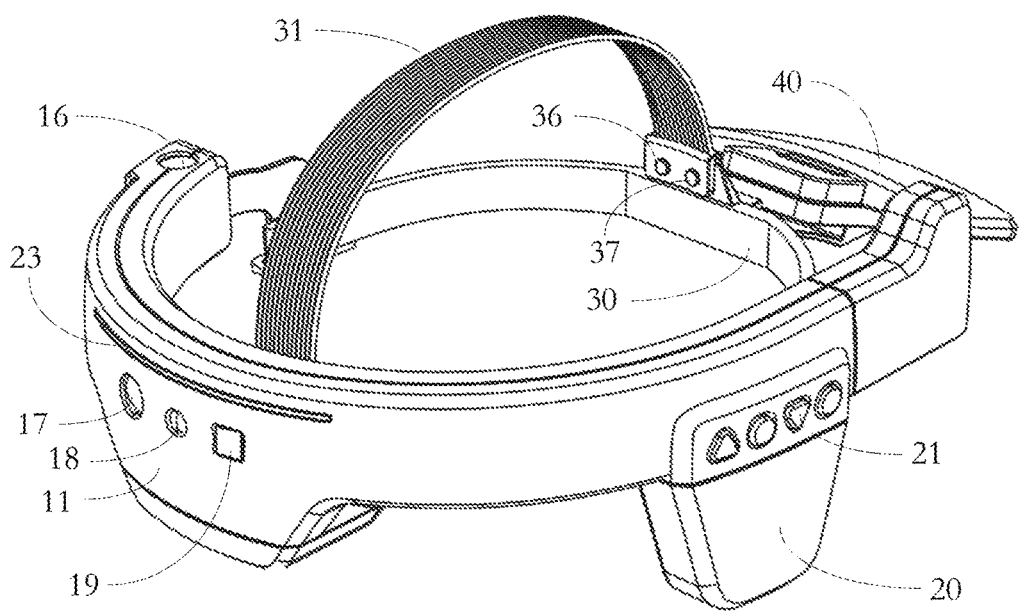
FIG. 2 is a schematic view of Embodiment 1 of the present invention at the second visual angle.
Figure 3:
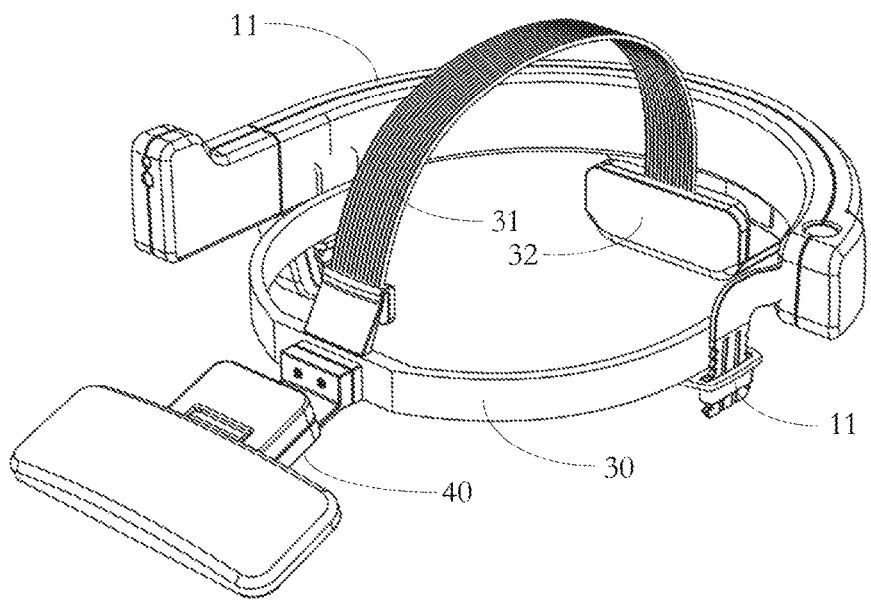
FIG. 3 is a schematic view of Embodiment 1 of the present invention at the third visual angle.

Embodiment 1:

As shown in FIG. 1~FIG. 3, the integrated intelligent head-mounted device in this embodiment comprises an external endless belt 10 and an internal frame 30, the external endless belt 10 may be mounted on the outer side of a safety helmet to from a loop, and the internal frame 30 may be mounted on the inner side of the safety helmet.

Figure 4:
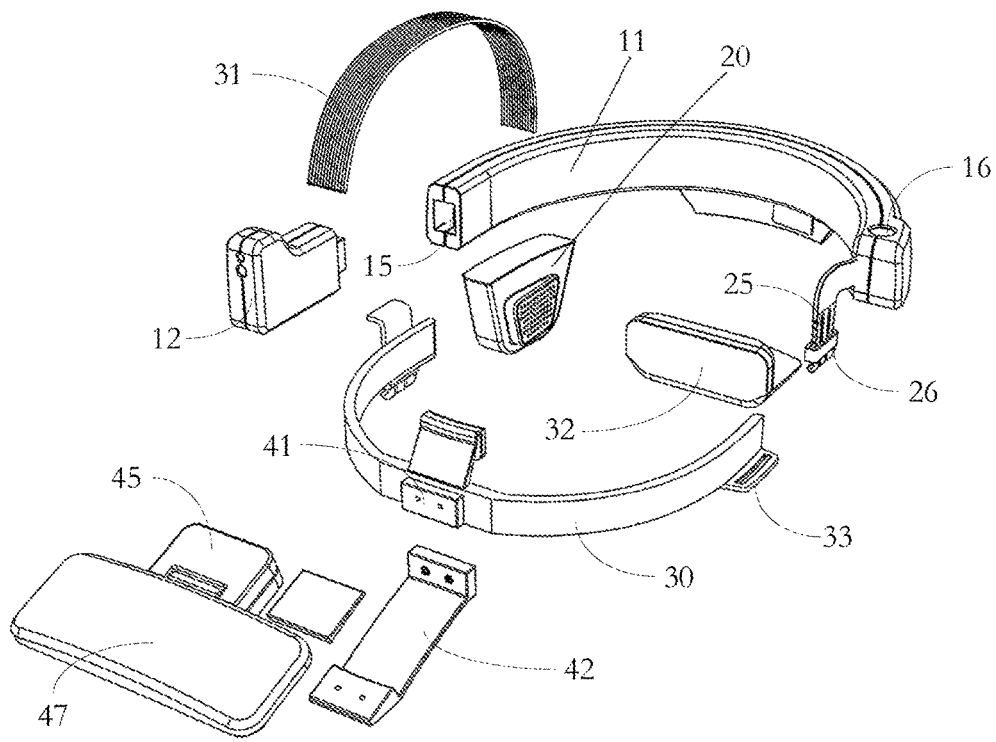
FIG. 4 is an exploded view of Embodiment 1 of the present invention.

The external endless belt 10 comprises an endless belt body 11. As shown in FIG. 4, the endless belt body 11 is substantially encircled into a ring shape, and disposed on the safety helmet in a sleeved manner. A spigot 15 is disposed at one end of the endless belt body 11, a mating member 12 is disposed outside of the endless belt body 11, and a lug is disposed at one end of the mating member 12 and may be inserted into the spigot 15, thereby fixing the mating member 12 on the endless belt body 11. A video camera 13 and a microphone 14 are disposed on an end face of the mating member 12, and the microphone 14 is disposed on the upper end of the video camera 13. After the external endless belt 10 is mounted on a safety helmet, the video camera 13 is used to shoot images in front of the safety helmet, so the video camera 13 is a front video camera. Of course, it is not necessary that the mating member 12 is mounted on the endless belt body 11 in a detachable manner. It may form an integral body with the endless belt body 11, too.

Preferably, the video camera 13 is mounted on the endless belt body 11 in a detachable manner. In this way, when the video camera 13 is not needed, it may be dismounted to alleviate the concerns of workers over privacy and reduce the weight of the external endless belt.

An integration module 20 is disposed under the endless belt body 11. In this embodiment, the integration module 20 and the endless belt body 11 are designed to be detachable, in other words, the integration module 20 is mounted under the endless belt body 11 in a detachable manner. Alternatively, the integration module 20 may form an integral body with the endless belt body 11. On the integration module 20, a loudspeaker and a microphone are integrated and a vibrator is disposed. A plurality of control buttons 21 is disposed on the exterior wall of the integration module 20. By pressing down the control buttons 21, the wearer may control the operations of the integrated intelligent head-mounted device, such as: start, shutdown, switching on LED lamp and sending a distress signal.

A control circuit (not shown) is disposed in the external endless belt 10, which may be designed on a flexible printed circuit board, and comprises a central processing unit (CPU), and is provided with an interphone module, an audio I/O module and a wireless communication module, such as a module for receiving 2G 3G or 4G signals, or a WIFI signal transceiver module or a Bluetooth signal transceiver module. The CPU conducts wireless communication with external devices, such as smart phones, through a wireless communication module.

An ultrasonic sensor 17 for detecting the distance between the integrated intelligent head-mounted device and objects behind it and a video camera 18 are disposed and a QR code 19 is pasted on the rear side of the external endless belt 10. When the ultrasonic sensor 17 is detected that the distance is being reduced, it will issue an alarm to the worker wearing the integrated intelligent head-mounted device. Further, the video camera 18 is intended to shoot the images behind the safety helmet, so the video camera 18 is a rear video camera. Obviously, in this embodiment, the integrated intelligent head-mounted device is provided with two video cameras, which are the front video camera 13 and the rear video camera 14 respectively and the images in front of and behind the safety helmet are shot by the two video cameras at the same time, thereby more accurately determining whether the wearer's position is in a dangerous situation or not.

The QR code 19 on the integrated intelligent head-mounted device may be the sole QR code of every integrated intelligent head-mounted device and used as the sole ID of every integrated intelligent head-mounted device, thereby helping the wearer identify his integrated intelligent head-mounted device. Moreover, in case of an accident, rescuers may determine the wearer of the integrated intelligent head-mounted device based on the QR code 19, thus determining the identities of the rescued people.

Moreover, an ultrasonic sensor 16 is disposed on the upper end of the external endless belt 10, faces upward and is intended to detect the distance of objects above the integrated intelligent head-mounted device, thereby judging whether any object above the safety helmet is falling down or is about to be collided with. Further, as shown in FIG. 2, an LED light strip 23 is further disposed on the exterior surface of the external endless belt 10, a plurality of LED lamp beads or strip shaped LED luminous band may be disposed inside the LED light strip 23. As the LED light strip 23 is disposed on the rear side of the integrated intelligent head-mounted device so that people behind the wearer can easily see the wearer wearing the integrated intelligent head-mounted device, and even in a dark environment, they will not run into the wearer by mistake. Further, the LED light strip may flicker to indicate alarm or lower power of the battery.

The internal frame 30 is substantially in a shape of semicircle, and a power supply 32 is disposed at the open end of the internal frame to supply power to a plurality of electronic elements in the integrated intelligent head-mounted device, including CPU on the control circuit, wireless communication module, as well as microphone, loudspeaker, vibrator and a plurality of sensors. The power supply may be any kind of primary battery or secondary battery, such as storage battery, lithium ion battery or polymer battery. Preferably, in order to charge the power supply 32, a USB charging interface may be disposed on the external endless belt 10 and is connected to the power supply via a connecting wire. After the external charging wire is connected to the USB interface, the power supply 32 may be charged. Preferably, during charging of the power supply 32, the integrated intelligent head-mounted device can still work normally.

Figure 7:
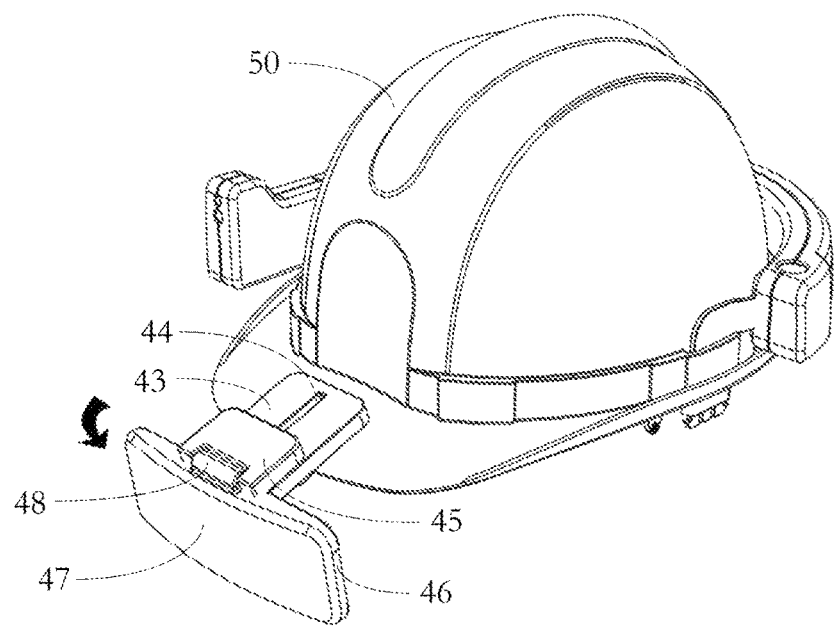
FIG. 7 is a schematic view of Embodiment 1 of the present invention in the third state after it is installed on a safety helmet.

As an alternative embodiment, a display device 40 may be disposed at the front end of the internal frame 30. In this embodiment, the display device 40 is mounted on the internal frame 30 in a detachable manner, so a mounting base 41 is disposed at the front end of the internal frame 30, while the display device 40 is provided with a holder, comprising a connecting piece 42 of which one end may be mounted to the mounting base 41 through screws. As shown in FIG. 7, a sliding seat 43 is fixed at the other end of the connecting piece 42, a chute 44 is disposed on the sliding seat 43, a sliding block 45 is mounted on the sliding seat 43, and a lug that may be mounted inside the chute 44 is disposed under the sliding block 45. In this way, the sliding block 45 may slide relative to the sliding seat 43.

In this embodiment, a connecting piece 42, a sliding seat 43 and a sliding block 45 constitute a first portion of the holder, a hinge 48 is disposed at one end of the sliding block 45, a second portion 46 of the holder is articulated on the sliding block 45 via the hinge 48, and a display screen 47 is fixed on the second portion 46. In this way, the second portion 46 may rotate relative to the sliding block 45, in other words, the second portion 46 of the holder may rotate relative to the first portion of the holder, and hence the display screen 47 may rotate relative to the first portion of the holder along with the rotation of the hinge 48. Further, as the sliding block 45 may slide relative to the sliding seat 43, the distance between the display screen 47 and the front end of the internal frame 30 may be adjusted.

In order that the power supply 32 supplies power to the display screen 47, a flexible conductor 31 is disposed on the internal frame 30 and connected to the power supply 32 and the display screen 47. As the power supply 32 is disposed at the rear end of the internal frame 30, and the display screen 47 is disposed at the front end of the internal frame 30, the flexible conductor 31 stretches from the front end of the internal frame 30 towards to the rear end of the internal frame 30. In order not to affect the wear of a safety helmet, the flexible conductor 31 needs to be long enough and in a shape of semicircle to fit on the internal surface of the safety helmet.

Of course, the display screen 47 may also receive power from a built-in power supply. In this way, it does not need to be connected to the power supply 32 via the flexible conductor 31. A WIFI module may be provided on the display screen 47 to realize connection with the control circuit and data interaction through WIFI signals.

As shown in FIG. 2, a plurality of health detection sensors for detecting human health is disposed on the head band of the helmet, for example, a temperature sensor 36 and a heart rate sensor 37 are disposed on one side adjacent to the mounting base 41, the temperature sensor 36 is intended to detect wearer's body temperature, while the heart rate sensor 37 is intended to detect wearer's heart rate. In this embodiment, the head band is a self-provided string of the helmet, a component prearranged inside the helmet. It is disposed on the inner side of the helmet and clings to human forehead. Moreover, an accelerometer sensor (not shown) may be mounted on CPU 61 and is intended to detect the acceleration of wearer's environment and judge whether the wearer is in an abnormal condition, such as fall.

In this embodiment, the health detection sensor may be electrically connected to a circuit embedded in the head band via a flexible conductor. Alternatively, the health detection sensor is a wireless sensor and sends detection signals to the control circuit by means of wireless transmission.

Of course, all sensors disposed on the head band, such as temperature sensor 36 and heart rate sensor 37, need to be electrically connected to the CPU of the control circuit and send detection signals to the CPU so that the CPU sends received signals to the intelligent device.

In order to realize fixation between the internal frame 30 and the external endless belt 10, an elastic buckle 25 is disposed on the external endless belt 10, which is located on the edge of the external endless belt 10 downwardly. A jack 33 is disposed on the internal frame 10. As shown in FIG. 4, the jack 33 is disposed on the outer edge of the internal frame 30, stretching outwardly on the external surface of the internal frame 30. In this way, the elastic buckle 25 may be inserted into the jack 33 downwardly. Preferably, the elastic buckle 25 is made of elastic material, such as elastic plastic, while the jack 33 is made of harder material, such as hard plastic. As such, when the elastic buckle 25 is inserted downwardly into the jack 33, it may be deformed elastically, whereas the jack 33 almost has no deformation, thereby ensuring that elastic buckle 25 is fixed inside the jack 33.

Moreover, in order to ensure the elastic buckle 25 is not come off from the jack 33, a retaining ring 26 may be used and sleeved on the lower end of elastic buckle 25 after the elastic buckle 25 is inserted into the jack 33. To ensure the retaining ring 26 fixes the elastic buckle 25, the area of the cross section of the retaining ring 26 needs to be smaller than the area enclosed by the cross section of the elastic buckle 25. In this way, when the retaining ring 26 is sleeved on the elastic buckle 25, the elastic buckle 25 may be deformed elastically, and after the elastic buckle 25 passes through the retaining ring 26, it cannot come off from the retaining ring 26 easily.

In this embodiment, the elastic buckle 25 as a first fastener is disposed on the external endless belt 10, and the jack 33 as a second fastener is disposed on the internal frame 30. During actual application, the elastic buckle may be disposed on the internal frame, while the jack is disposed on the external endless belt. Alternatively, the internal frame 30 and the external endless belt 10 are fixed not through the coordination of the elastic buckle and the jack, and the first fastener and the second fastener may have other forms, such as coordination between pin and pin hole, and coordination of buttons.

Figure 9:
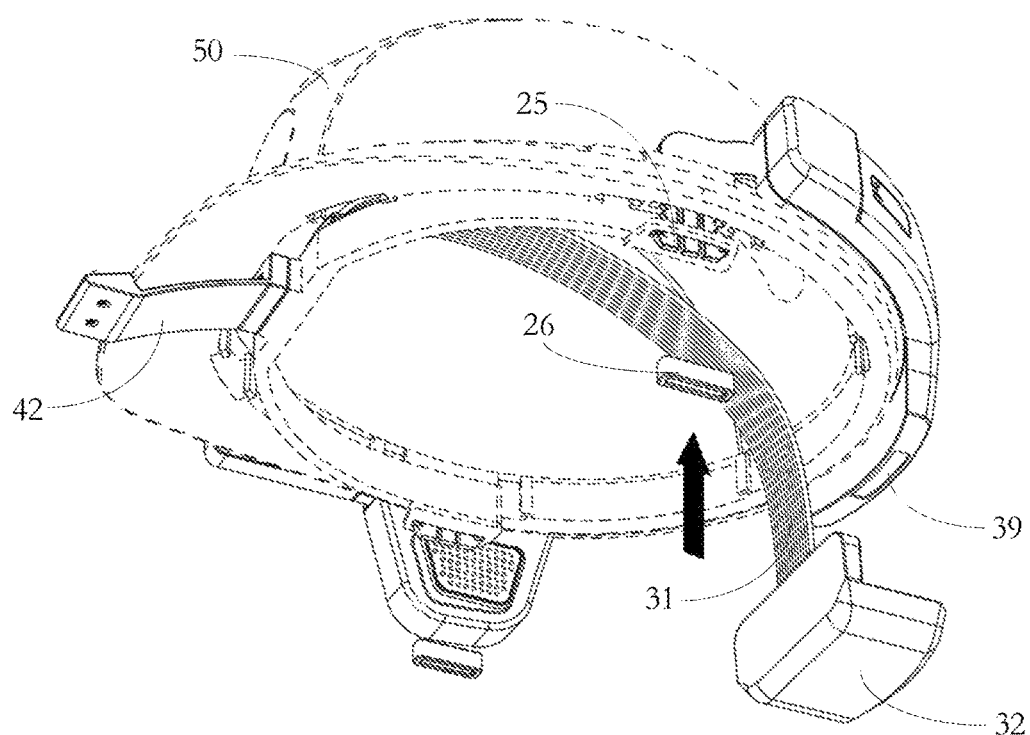
FIG. 9 is a schematic view of Embodiment 1 of the present invention in the second stage when it is installed on a safety helmet.
Figure 10:
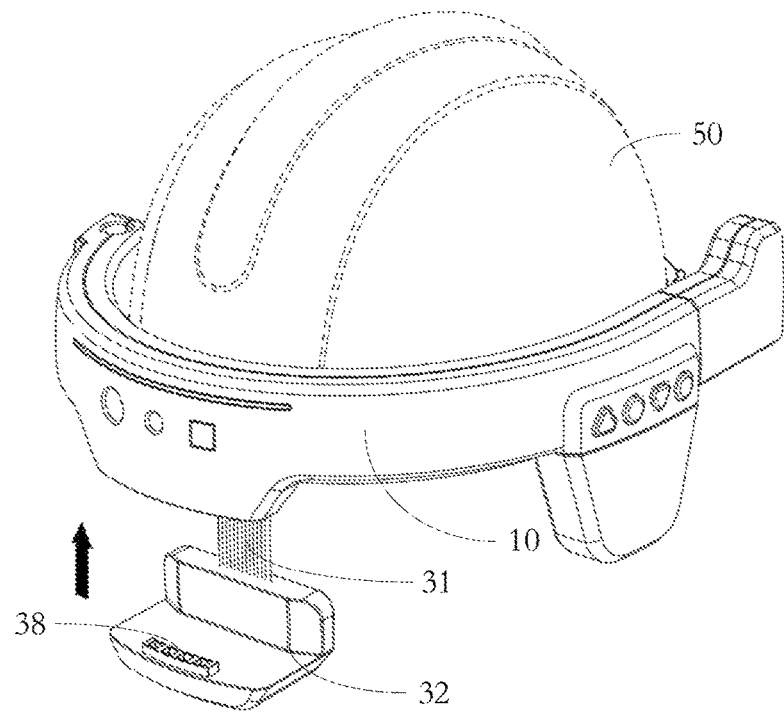
FIG. 10 is a schematic view of Embodiment 1 of the present invention in the third stage when it is installed on a safety helmet.

In order to realize electric connection between the internal frame 30 and the external endless belt 10, as shown in FIG. 9 and FIG. 10, a plurality of terminal blocks 38 is disposed on the rear side of the power supply 32, and a plurality of corresponding terminal blocks is disposed at the lower end of the external endless belt 10. For example, a plurality of terminal blocks is disposed inside the crevice 39 at the lower end of the external endless belt 10, and a plurality of connecting terminals 38 on the rear side of the power supply 32 may be inserted into the crevice 39 and electrically connected to a plurality of terminal blocks on the external endless belt 10. In this way, the power supply 32 may supply power to the electronic elements on the external endless belt 10 through these terminal blocks, while the display screen 47 on the internal frame 30 may receive signals sent by CPU and other devices.

Figure 5:
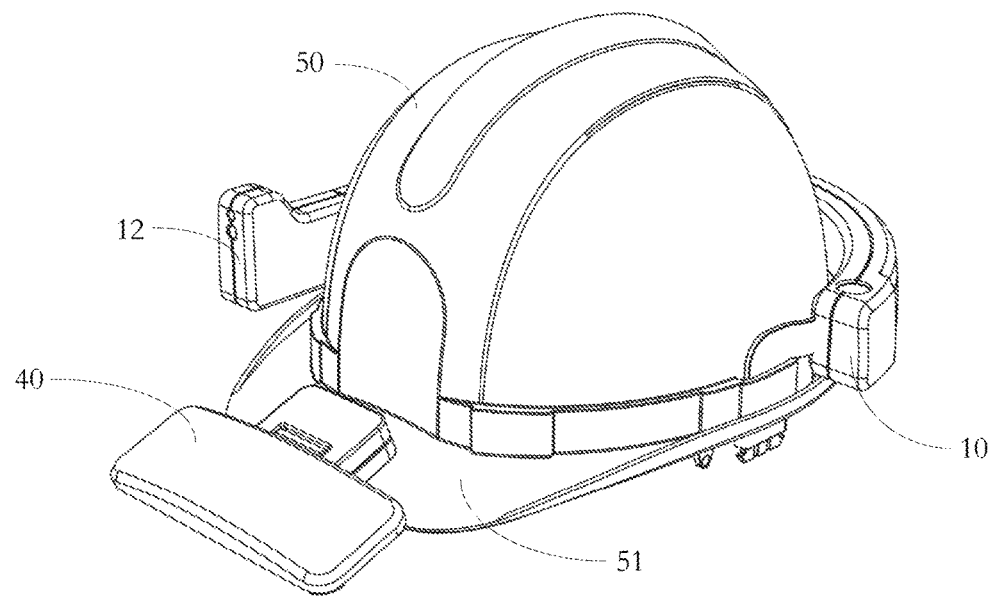
FIG. 5 is a schematic view of Embodiment 1 of the present invention in the first state after it is installed on a safety helmet.
Figure 6:
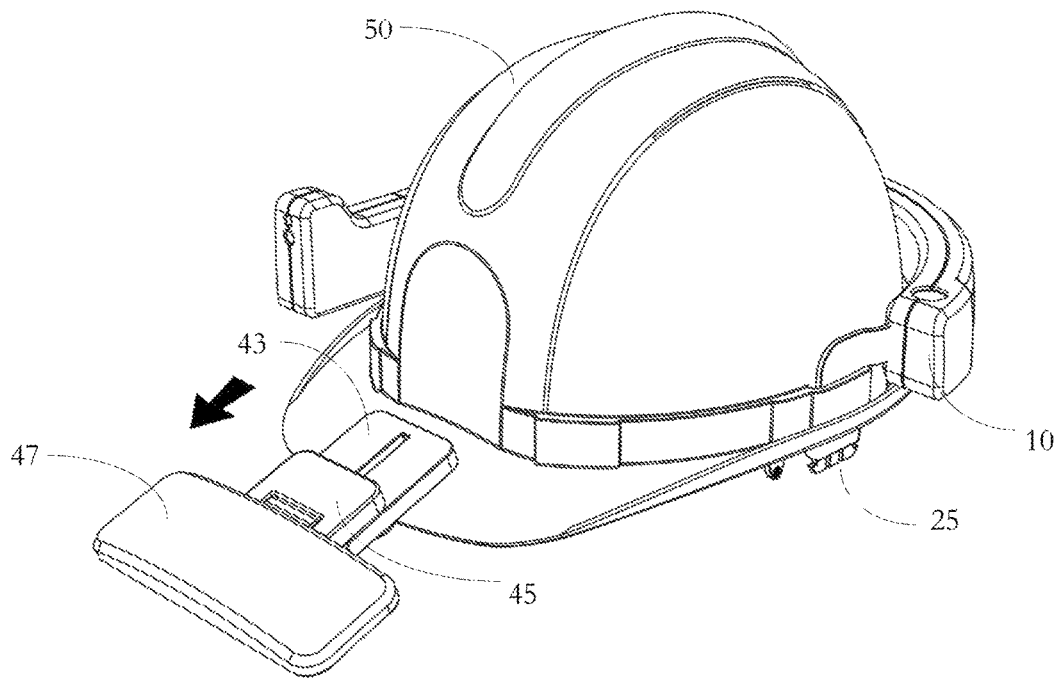
FIG. 6 is a schematic view of Embodiment 1 of the present invention in the second state after it is installed on a safety helmet.

As shown in FIG. 5~FIG. 7, the integrated intelligent head-mounted device may be mounted on a safety helmet 50, i.e.: the internal frame 30 is mounted on the inner side of the body of the safety helmet 50, while the external endless belt 10 is mounted on the outer side of the body of the safety helmet 50, so the external endless belt 10 is visible outside the safety helmet 50. Moreover, the display screen 47 mounted on the internal frame 30 stretches out of a visor 51, and the sliding seat 43 and the sliding block 45 are both above the visor 51.

After the internal frame 30 and the external endless belt 10 are mounted on a safety helmet 50, the wearer may adjust the position of the display screen 47, if desired, to make for the view of information on the display screen. For example, after the internal frame 30 is mounted to a helmet body, the initial state of the display device 40 is as shown in FIG. 5, the sliding block 45 fully overlaps with the sliding seat 43, and the display screen 47 does not display rotation in opposite direction, in other words, the display screen 47 and sliding block 45 are on a same plane. When the display screen 47 needs to be used, as shown in FIG. 6, the sliding block 45 slides outwardly, i.e.: the sliding block 45 slides relative to the sliding seat 43 and along a direction away from the helmet body, as indicated by the arrow in FIG. 6, so that the sliding block 45 and the sliding seat 43 are apart. When the sliding block 45 slides outwardly to the end as shown in FIG. 7, the second portion 46 of the holder flips down as indicated by the arrow in FIG. 7. In this way, the second portion 46 will flip around the hinge 48 and relative to the first portion and form an included angle of approximately 90°. As the display screen 47 is fixed on the second portion 46, it will flip down along with the second portion 46. In this way, the wearer is able to see the images displayed on the display screen 47.

In this embodiment, as the display screen 47 is located on the outer side of the visor 51, it won't block the view of the wearer. Moreover, as the display screen 47 is below the visor 51, the wearer can see the images on the display screen 47 simply by looking upwards, which leads to convenient use of the product. Preferably, the images shot by a video camera may be displayed on the display screen 47, and meanwhile the display screen 47 may display the images transmitted by CPU 61 to achieve the effect of augmented reality.

Figure 8:
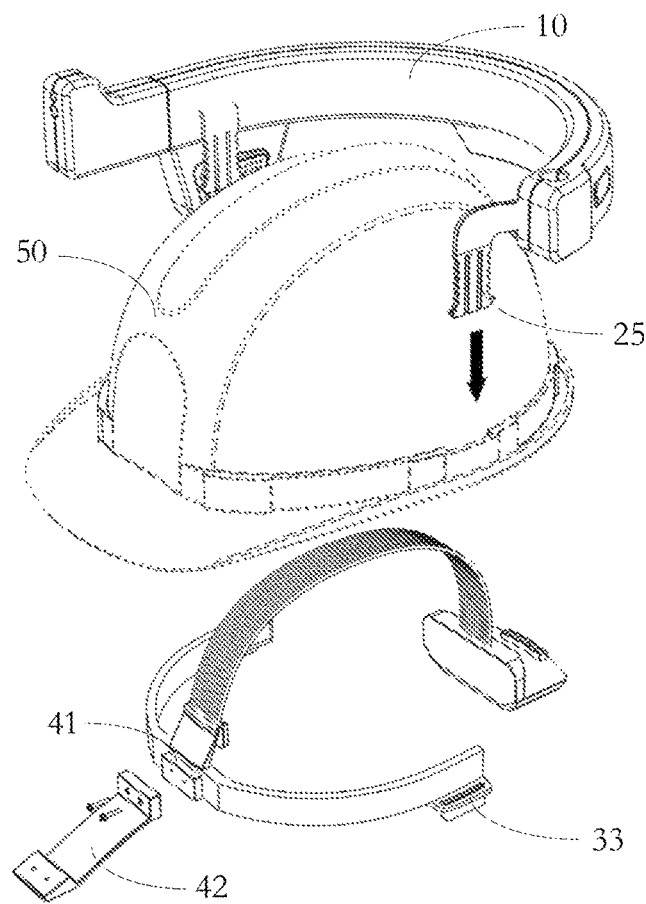
FIG. 8 is a schematic view of Embodiment 1 of the present invention in the first stage when it is installed on a safety helmet.

Below the process of mounting the integrated intelligent head-mounted device on a safety helmet 50 is set forth in detail by referring to FIG. 8~FIG. 11. Firstly, as shown in FIG. 8, put the internal frame 30 on the inner side of the safety helmet 50, put the external endless belt 10 on the outer side of the safety helmet 50, and insert the elastic buckle 25 on the external endless belt 10 into the jack 33 of the internal frame 30 downwardly, as indicated by the arrow in FIG. 8. Further, use screw, pin, buckle or magnet to fix the connecting piece 42 on the mounting base 41.

Next, as shown in FIG. 9, sleeve the retaining ring 26 onto the outside of the elastic buckle 25 upwardly, as indicated by the arrow in FIG. 9. In this way, the elastic buckle 25 is locked inside the retaining ring 26 and cannot come off from the jack 33, avoiding mutual separation between the internal frame 30 and the external endless belt 10.

Preferably, a jack 33 is disposed on each of the two sides of the internal frame 30, and an elastic buckle 25 is disposed on each of the two sides of the external endless belt 10, thus the fixation between the internal frame 30 and the external endless belt 10 is realized through the coordination between two elastic buckles 25 and two jacks 33.

Then, as shown in FIG. 10, push upwards the power supply 32 connected to the flexible conductor 31, as indicated by the arrow in FIG. 10, so that a plurality of connecting terminals 38 on the power supply 32 is inserted into the external endless belt 10 and connected to the power supply inside the external endless belt 10, thereby realizing electric connection between a plurality of electronic elements on the internal frame 30 and a plurality of electronic elements on the external endless belt 10.

Figure 11:
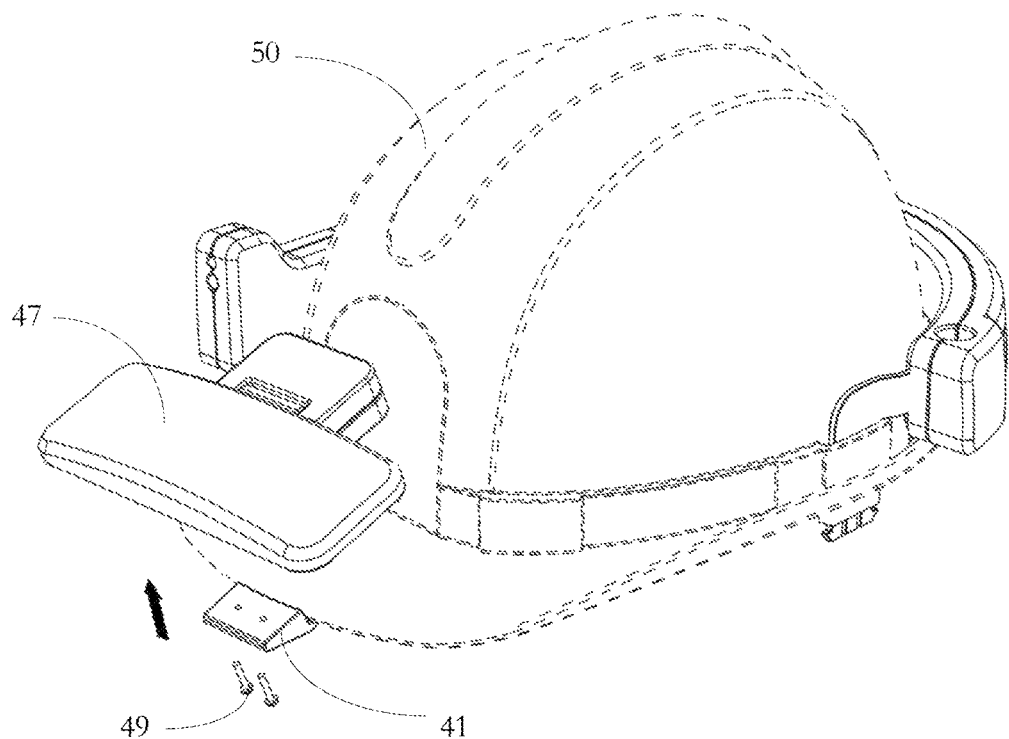
FIG. 11 is a schematic view of Embodiment 1 of the present invention in the fourth stage when it is installed on a safety helmet.

Lastly, as shown in FIG. 11, use screw 49, pin, buckle or magnet to fix the sliding seat 43 of the display device 40 on the connecting piece 41, as indicated by the arrow in FIG. 11, thus completing the installation of the display device 40. When the display screen 47 needs to be used, it may be dragged outwardly so that the sliding block 45 slides relative to the sliding seat 43, and then the second portion 46 of the holder flips down to set the display screen 47 in a position of watch.

Obviously, the assembly of the integrated intelligent head-mounted device is very convenient. Through simple assembly, the wearer may install the integrated intelligent head-mounted device to a safety helmet 50, and no holes need to be drilled on the safety helmet 50, so the original structure and impact strength of the safety helmet 50 will not suffer. Moreover, the integrated intelligent head-mounted device may be dismounted from the safety helmet 50. For example, by removing the retaining ring 26 from the elastic buckle 25, and retreating the elastic buckle 25 from the inside of the jack 33, the internal frame 30 may be separated from the external endless belt 10, and dismounted from the safety helmet 50. During next use, the integrated intelligent head-mounted device may be installed on a safety helmet 50 through simple assembly. Even if the wearer changes safety helmets, he may still repeatedly use the integrated intelligent head-mounted device.

Figure 12:
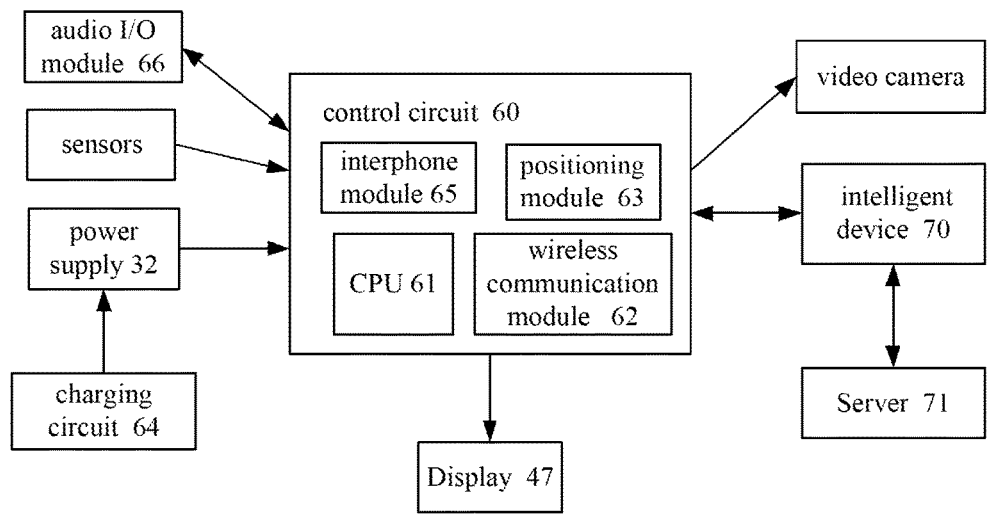
FIG. 12 is an electrical block diagram of Embodiment 1 of the present invention and an intelligent device.

Below the working principle of the intelligent head-mounted device is introduced by referring to FIG. 12. A CPU 61, a wireless communication module 62, a positioning module 63 and an interphone module 65 are disposed on the control circuit 60 inside the external endless belt 10, The CPU 61 of the control circuit 60 may receive signals sent by a plurality of sensors, including temperature sensor detecting wearer's body temperature, heart rate sensor, ultrasonic sensor and accelerometer sensor. Moreover, the CPU 61 may further receive sound signals acquired by a microphone, and acquire image signals acquired by the video camera. As the integrated intelligent head-mounted device is provided with a plurality of microphones and video cameras, the CPU 61 may receive images acquired by a plurality of microphones and video cameras. The interphone module 65 may be electrically connected to an audio I/O module 66, and is intended to output audio signals to the audio I/O module 66, thereby outputting audio signals to a loudspeaker, and receiving audio signals inputted by the audio I/O module 66, for example, receiving audio signals from a microphone.

Moreover, the CPU 61 may output video signals to a display 47 and may also send signals to a loudspeaker and a vibrator, for example, send control signals to a loudspeaker to control the sound signals outputted by the loudspeaker, or send control signals to a vibrator to control vibration of the vibrator.

Further, the power supply 32 may supply power to a plurality of electronic elements, including the control circuit 60, a plurality of sensors, the video camera, the microphone and the display screen 47. In order to charge the power supply 32, a charging circuit 64 is arranged in the integrated intelligent head-mounted device. For example, the charging circuit 64 is connected to a USB charging interface, and charge the power supply 32 after the external current is converted into low voltage direct current.

The CPU 61 sends signals to an intelligent device 70 through a wireless communication module 62. The intelligent device 70 may be a smart phone, a tablet computer or any other intelligent electronic element with computing power. When the intelligent device 70 receives signals sent by the CPU 61, such as wearer's body temperature, heart rate and other data, or data of distance from other objects in the surrounding environment detected by a distance sensor, or images acquired from video cameras, it judges whether the wearer's body is in an abnormal state, for example, whether the body temperature is too high or the heart rate is abnormal, and meanwhile judges if the wearer is in a dangerous environment at present, for example, whether any object above or behind the wearer is approaching the wearer at a high speed. If an object above the wearer is approaching the wearer at a high speed, it suggests an object is falling above the wearer. Once the intelligent device 70 finds the wearer is in an abnormal physical condition or in a dangerous environment, it will send a prompt signal to the CPU 61 at once. The CPU 61 will send alarm information through a loudspeaker or vibrator, such as voice prompt or vibration signal of alarm, to prompt the wearer or the people near the wearer that the wearer is unwell or in a dangerous environment at moment.

The positioning module 63 may be a GPS module or any other module with a function of positioning. After determining the position of the intelligent head-mounted device, the positioning module 63 sends the information of the current position to a CPU 61. The CPU 61 may send the information of the current position to an intelligent device 70 so that the intelligent device 70 displays the position of the intelligent head-mounted device.

No doubt, analyzing images and judging if the wearer is in a dangerous environment often needs enormous calculation and analysis, which usually needs to be handled by a device with strong computing power, so a server 71 may be provided to process images, in other words, the intelligent device 70 may send acquired signals to the server 71. After the server 71 receives a signal sent by the intelligent device 70, it processes the received signal, analyzes if the wearer is unwell or in a dangerous environment or in an abnormal state, and returns the analysis result to the intelligent device 70, and the intelligent device 70 will send signals to the CPU 61.

In addition, as wearers are mostly construction workers and need to work outdoors, the integrated intelligent head-mounted devices usually are exposed to an environment with high temperature, resulting in high temperature of the power supply 32, even inducing potential safety risks. Therefore, a battery temperature sensor exclusively for detecting the temperature of the power supply 32 is provided in the external endless belt 10, and sends detection signals to the CPU 61. When the CPU 61 detects the temperature of the power supply 32 is too high, it will stop the power supply 32 to avoid long-time operation of the power supply 32 at high temperature.

Figure 13:
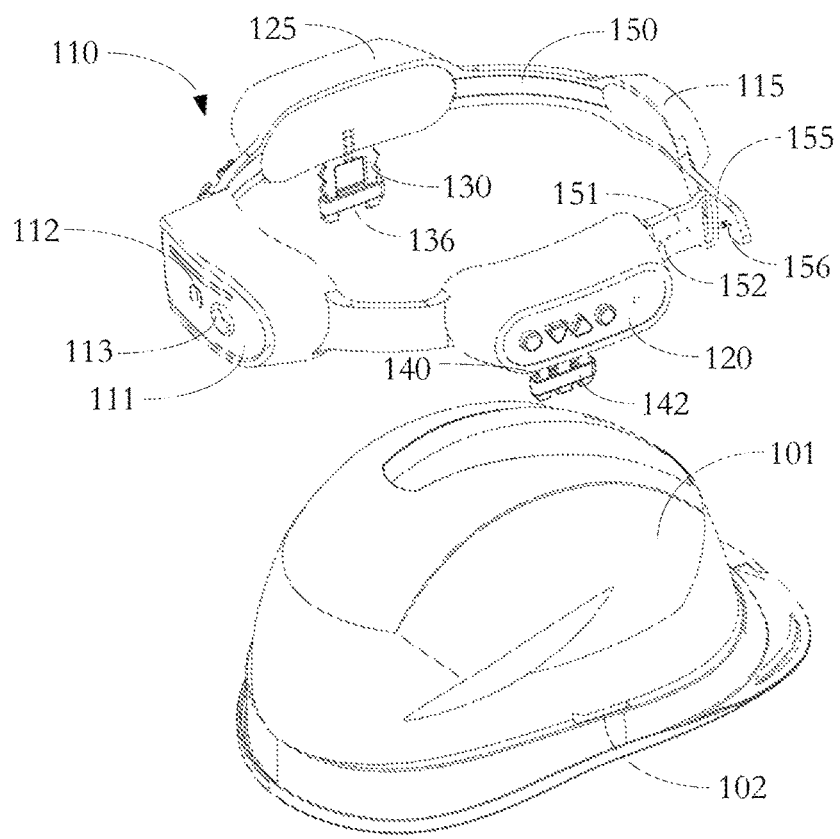
FIG. 13 is a schematic view of Embodiment 2 of the present invention and a helmet.
Figure 14:
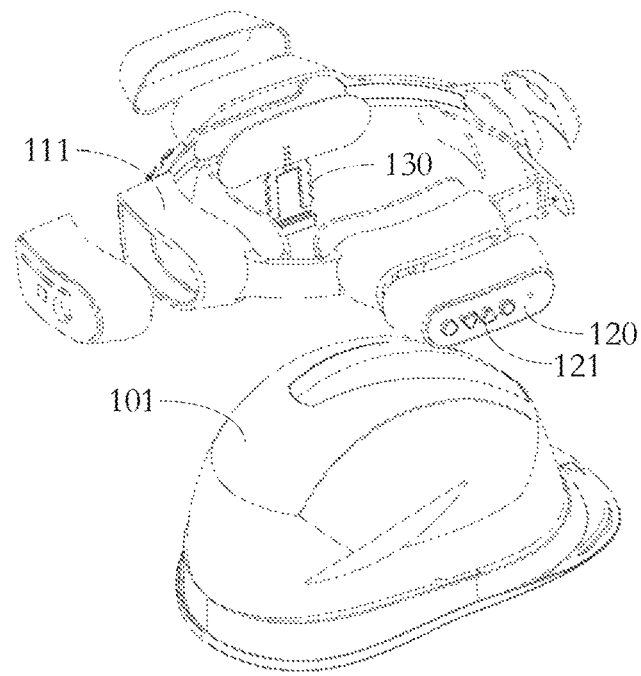
FIG. 14 is an exploded view of Embodiment 2 of the present invention and a helmet.

Embodiment 2:

As shown in FIG. 13 and FIG. 14, the integrated intelligent head-mounted device 110 in this embodiment is mounted on a helmet 101 in a detachable manner. Preferably, a jack 102 is disposed on each of the two sides of the helmet 101. Different from Embodiment 1, the integrated intelligent head-mounted device 110 in this embodiment only comprises an external endless belt, which is mounted on the outer side of the helmet 101 to form a loop. In other words, no internal frame is provided. The external endless belt comprises integration modules 111, 115, 120 and 125, and further comprises a connecting band 150. Preferably, a containing chamber accommodating the four integration modules 111, 115, 120 and 125 are arranged on the external endless belt in advance, thereby arranging the four integration modules 111, 115, 120 and 125 inside the containing chamber to form an integral external endless belt.

A control circuit and a video camera 112 are disposed in the integration module 111. A CPU, a wireless communication module and a positioning module are disposed in the control circuit. The structure of the control circuit is same as the structure of Embodiment 1, and will not be elaborated again. The video camera 112 may shoot images behind the helmet 101. Preferably, the video camera 112 is mounted on the integration module 111 in a detachable manner. That is to say, the video camera 112 may be dismounted at any time, or mounted on the integration module 111 at any time. Of course, an LED light strip may be further disposed on the integration module 111 to help people behind the wearer observe the wearer of the helmet 101. Preferably, an anti-collision ultrasonic sensor 113 is disposed on the integration module 111, and may send ultrasonic signals to detect people or objects behind the wearer and send detection signals to a processor. Once the anti-collision ultrasonic sensor 113 detects other people or other objects, the sensor 113 will send a signal to the processor. The processor may send a prompt signal through a loudspeaker or a buzzer to avoid collision of the person wearing the helmet 101 with other people or other objects.

Alternatively, a video camera may be disposed on the integration module 115 to shoot the images in front of the helmet 101. Preferably, the video camera disposed on the integration module 115 is mounted on the integration module 115 in a detachable manner. Besides, a display screen is mounted on the integration module 115 in a detachable manner, and arranged in front of the integration module 115 so that the wearer of the integrated intelligent head-mounted device can see the images in front of and behind him in time. Optionally, the display screen is mounted on a helmet 101 via a holder. The structures of the display screen and the holder are same as described in Embodiment 1 and will not be described herein again.

Power supplies may be mounted in the integration module 111 and the integration module 125. Preferably, charging interfaces are arranged on the integration module 111 and the integration module 125 to make for charging of the power supplies. Preferably, during charging of the power supplies, the integrated intelligent head-mounted device 110 can still work normally. Moreover, a plurality of control buttons 121 is disposed on the integration module 120, each of which is connected to the control circuit. In this way, the wearer may control the operation of the integrated intelligent head-mounted device through a plurality of control buttons 121, for example, switching on or off the video camera 112 and sending a distress signal to an intelligent device.

In this embodiment, a plurality of integration modules is connected by a connecting band 150. Flexible conductors are arranged in the connecting band 150. For example, the integration module 111 is connected to the integration module 120 via a flexible conductor, by which the power supply in the integration module 111 may supply power to the video camera 112 and the control circuit via a flexible conductor. Likewise, the power supply in the integration module 125 may supply power to the video camera and the display screen on the integration module 115 via a flexible conductor. Of course, the display screen may have a built-in power supply and receive power from its self-built power supply. Besides, a microphone jack may be arranged on the integration module 120, and a microphone may be inserted into the microphone jack and is electrically connected to the control circuit via a flexible conductor. Preferably, a loudspeaker and a vibrator may be disposed on the integration module 120, which are also electrically connected to the control circuit via a flexible conductor. The vibrator may send a vibration signal when the control circuit sends a control signal.

A plurality of safety detection sensors is disposed on the integrated intelligent head-mounted device 110, such as ultrasonic sensor and accelerometer sensor. These safety detection sensors may be arranged in the integration module 111. By detecting the surrounding environment of the wearer and own signals, the safety detection sensors judge if the wearer is in a dangerous environment at present, for example, whether any object above or behind the wearer is approaching the wearer at a high speed. If an object above the wearer is approaching the wearer at a high speed, it is suggested that an object may be fallen above the wearer or about to collide with.

A plurality of locking holes 152 is disposed at a first end of the connecting band 150, and a pin 156 is disposed at a second end 155 of the connecting band 150. The pin 156 may be inserted into a locking hole 152, thereby mounting the integrated intelligent head-mounted device 110 on a helmet 101. As a plurality of locking holes 152 are arranged along the length direction of the connecting band 150, the wearer may select an appropriate locking hole 152 according to the outer diameter of the helmet 101 to ensure the integrated intelligent head-mounted device 110 is firmly mounted on helmets 10 in various sizes.

Figure 15:
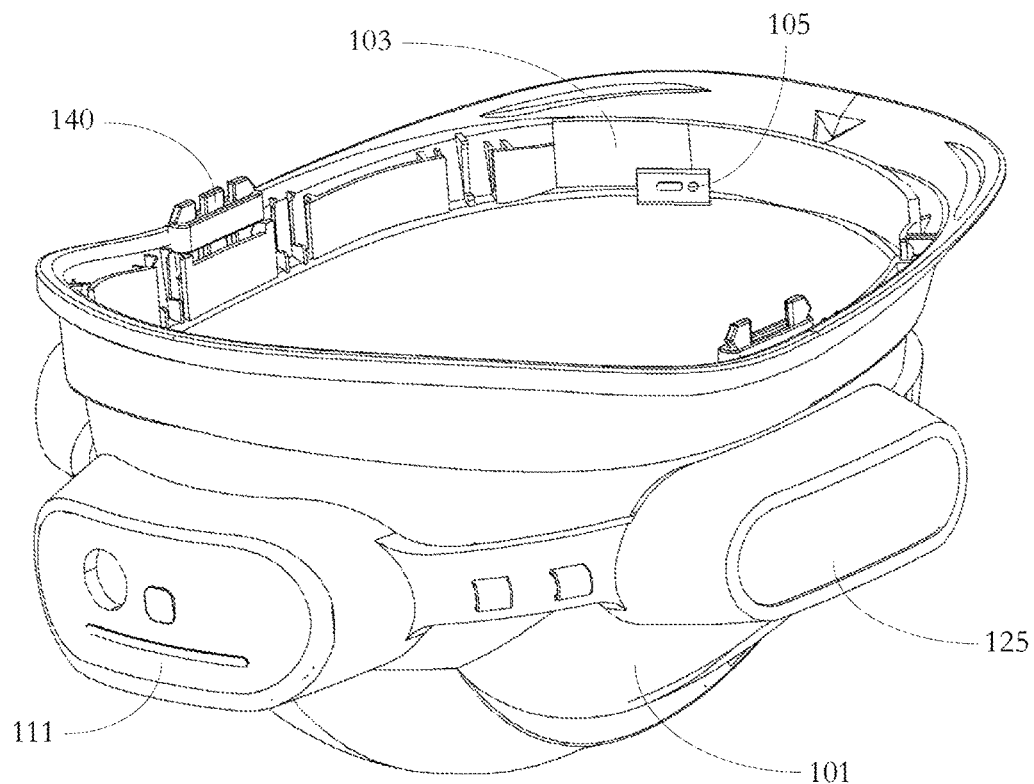
FIG. 15 is a schematic view of Embodiment 2 of the present invention after it is installed on a helmet.

Further, the integrated intelligent head-mounted device 110 further comprises at least one health detection sensor. As shown in FIG. 15, a health detection sensor 105 is disposed on the head band 103 of a helmet 101. The head band 103 is a self-provided string of the helmet 101, a component prearranged inside the helmet 101. In this embodiment, the health detection sensor comprises a temperature sensor and a heart rate sensor, for example, the temperature sensor is intended to detect the body temperature of the bearer, while the heart rate sensor is intended to detect the heart rate of the bearer. As the head band 103 is in the innermost layer of the helmet 101 and clings to wearer's forehead, the health detection sensor will cling to the forehead of the wearer to raise accuracy of detection.

In this embodiment, an elastic buckle is disposed on the belt. As shown in FIG. 13 and FIG. 15, an elastic buckle 130 is disposed under the integration module 125 downwardly. As a jack 102 is disposed on the helmet 101, the elastic buckle 130 may be inserted into the jack 102 downwardly. Preferably, the elastic buckle 130 is made of elastic material, such as elastic plastic, while the helmet 101 is made of harder material, such as hard plastic. In this way, when the elastic buckle 130 is inserted downwardly into the jack 102, the elastic buckle 130 may be deformed elastically, whereas the jack 102 almost has no deformation, thereby ensuring the elastic buckle 130 is fixed inside the jack 102.

Moreover, in order to ensure the elastic buckle 130 will not come off from the jack 102, a retaining ring 136 may be used and sleeved on the lower end of the elastic buckle 130 after the elastic buckle 130 is inserted into the jack 102. To ensure the retaining ring 136 fixes the elastic buckle 130, the area of the cross section of the retaining ring 136 needs to be smaller than the area enclosed by the cross section of the elastic buckle 130. In this way, when the retaining ring 136 is sleeved on the elastic buckle 130, the elastic buckle 130 may be deformed elastically, and after the elastic buckle 130 passes through the retaining ring 136, it cannot come off from the retaining ring 136 easily. In order to realize fixation between the belt and the helmet 101, the elastic buckle 130 is locked by the retaining ring 136 only after it has passed through the jack 102.

Likewise, an elastic buckle 140 is also disposed under the integration module 120, and may also pass through the jack 102 disposed on the helmet 101 and is locked by the retaining ring 142.

Figure 16:
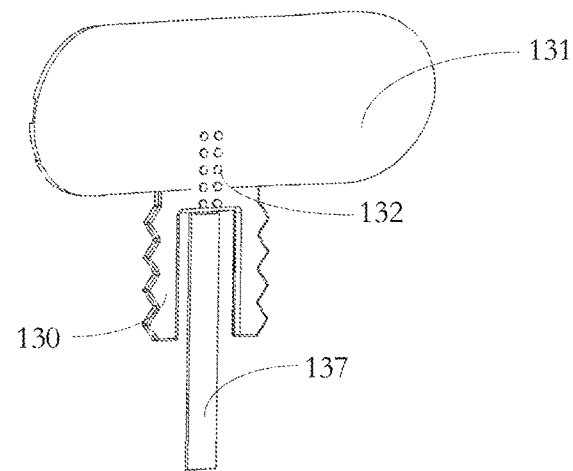
FIG. 16 is a schematic view of a power board and flexible wires in Embodiment 2 of the present invention.
Figure 17:
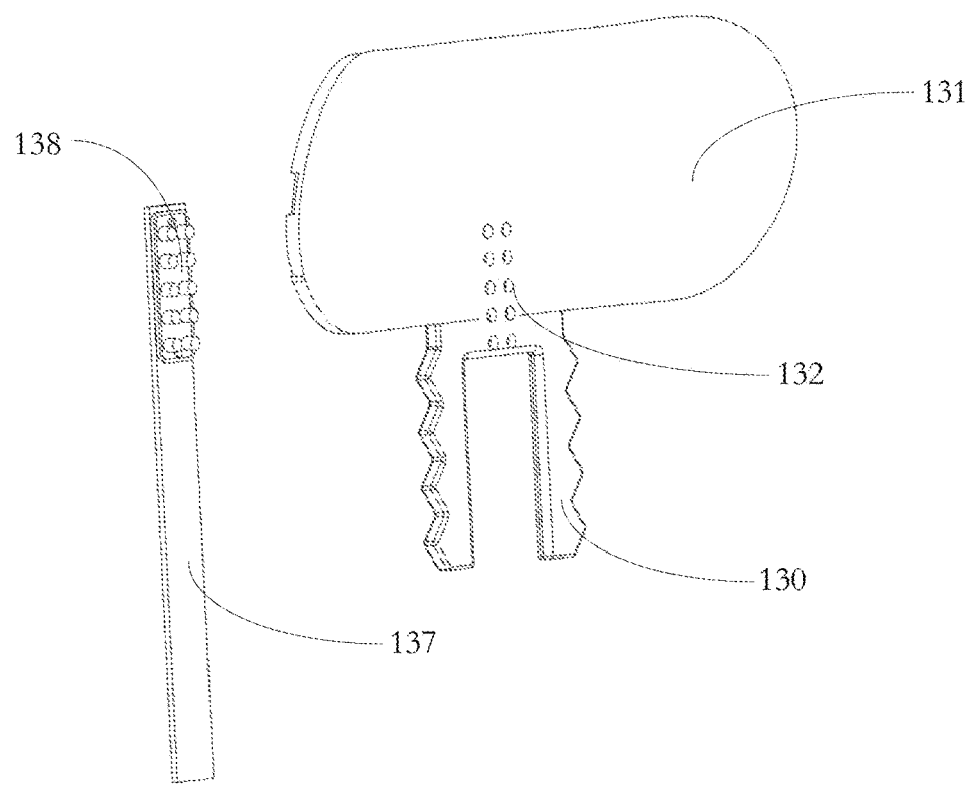
FIG. 17 is an exploded view of a power board and flexible wires in Embodiment 2 of the present invention.
Figure 18:
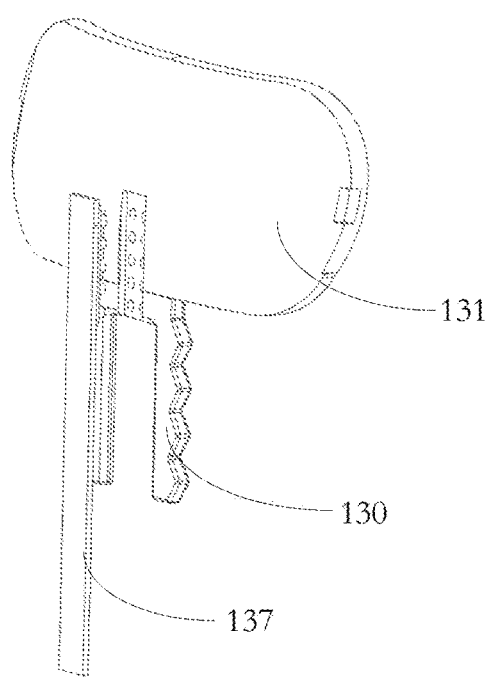
FIG. 18 is an exploded view of a power board and flexible wires in Embodiment 2 of the present invention at an alternative visual angle.

In order to realize electric connection between a plurality of health detection sensors and a control circuit, a power board is disposed on an elastic buckle 130 and an elastic buckle 140. Below the structure of the power board on the elastic buckle 130 will be introduced by referring to FIG. 16~FIG. 18. In this embodiment, a power board 131 is disposed on the elastic buckle 130, and a plurality of power jacks 132 is disposed on the power board 131.

The integrated intelligent head-mounted device 110 is provided with a flexible wire 137, a plurality of electric terminals 138 is disposed on the flexible wire 137, and every electric terminal 138 protrudes outwardly from the flexible wire 137. In this way, every electric terminal 138 may be inserted into a power jack 132. In other words, the flexible wire 137 may be coupled with the power board 131 and electrically connected to the power board 131.

In this embodiment, a flexible conductor is disposed on the head band 103 of the helmet 101, and electrically connected to the flexible wire 137, so the health detection sensor disposed on the head band 103 is electrically connected to the control circuit via the flexible conductor, the flexible wire 137 and the power board 131. Besides, the health detection sensors may also acquire electricity from power supplies through flexible conductors.

Optionally, health detection sensors may also use wireless sensors, in other words, wireless transmission modules, such as WIFI modules or Bluetooth modules, are disposed on the health detection sensors, while a corresponding wireless transmission module is disposed on the control circuit. The control circuit acquires signals of the health detection sensors through the wireless transmission module.

When the integrated intelligent head-mounted device 110 works, the CPU of the control circuit sends signals to an intelligent device via the wireless communication module. The intelligent device may be a smart phone, a tablet computer or any other intelligent electronic element with computing power. When the intelligent device receives signals sent by the CPU, such as wearer's body temperature, heart rate and other data, or data of distance from other objects in the surrounding environment detected by an ultrasonic sensor, or images acquired from video cameras, it judges whether the wearer's body is in an abnormal state, for example, whether the body temperature is too high or the heart rate is abnormal, and meanwhile judges if the wearer is in a dangerous environment at present, for example, whether any object above or behind the wearer is approaching the wearer at a high speed. If an object above the wearer is approaching the wearer at a high speed, it is suggested that an object is fallen above the wearer. Once the intelligent device finds the wearer is in an abnormal physical condition or in a dangerous environment, it will send a prompt signal to the CPU immediately. The CPU will send alarm information through a loudspeaker or vibrator, such as voice prompt or vibration signal of alarm or the combination thereof, to prompt the wearer or the people near the wearer that the wearer is unwell or in a dangerous environment at moment.

Thus it can be seen, as the integrated intelligent head-mounted device can monitor the physiological parameters of the wearer in real time and acquire real-time environmental information, it can judge the physical condition and ambient condition of the wearer with the help of an intelligent device or a server, and in case of abnormality, it can remind the wearer in time and protect the physical health and personal safety of the wearer.

As the integrated intelligent head-mounted devices are massively used on construction sites, effective charging method may assure effective use of the integrated intelligent head-mounted devices and high acceptability of workers. A preferred method is wireless charging.

Figure 19:
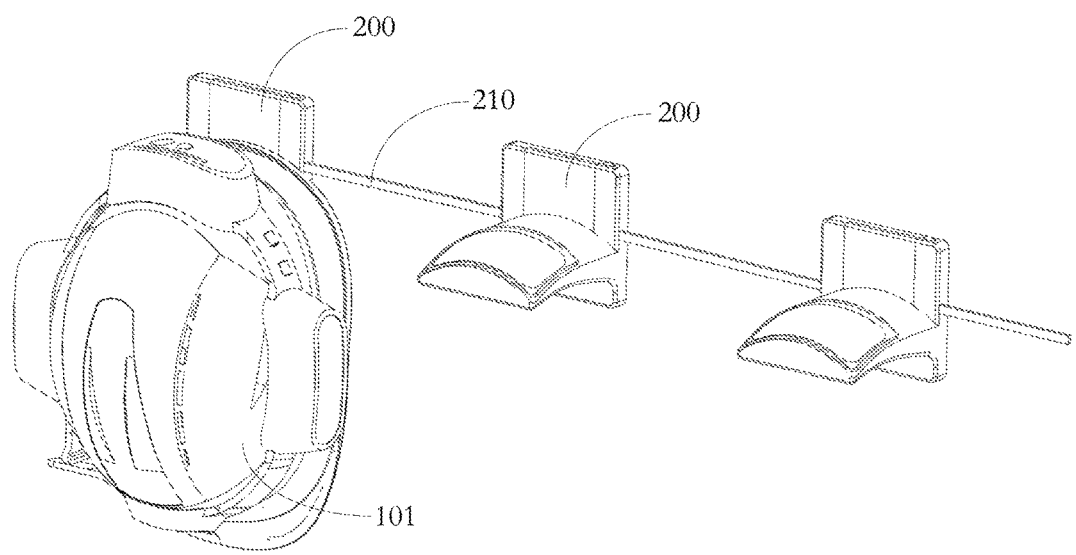
FIG. 19 is a schematic view showing a wireless charging device is charging Embodiment 2 of the present invention.
Figure 20:
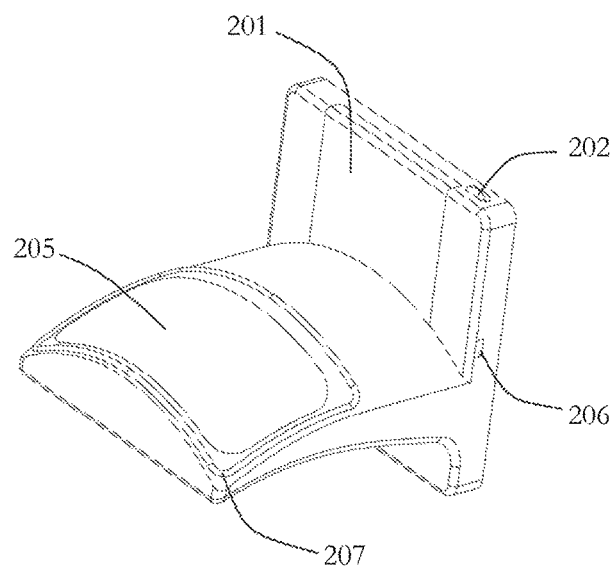
FIG. 20 is a schematic view of a wireless charging device.
Figure 21:
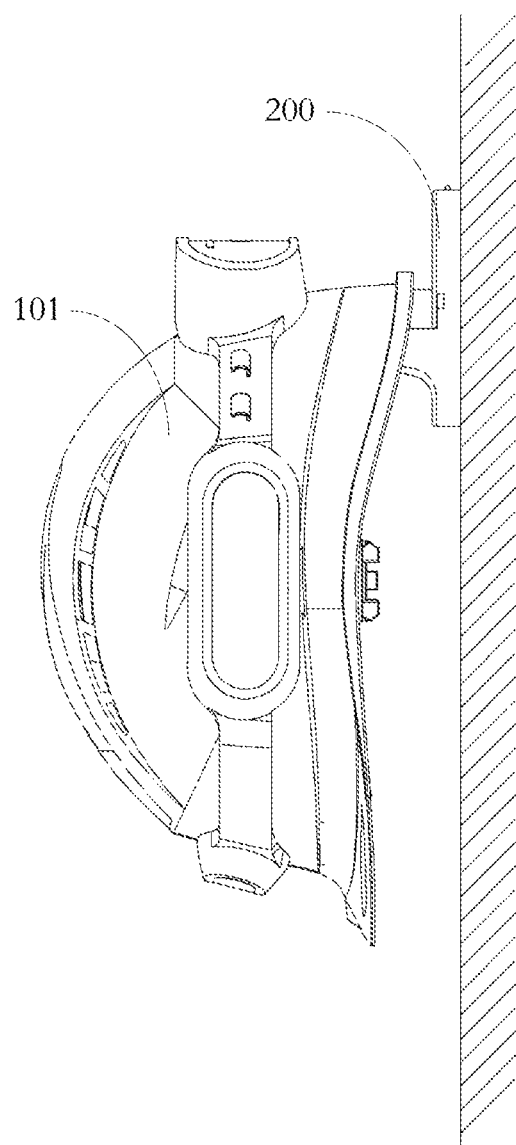
FIG. 21 is a schematic view of Embodiment 2 of the present invention and a wireless charging device.

As shown in FIG. 19~FIG. 21, a plurality of wireless charging devices 200 may be arranged on a wall, and mutually connected with a connecting rod 210, thus forming a combination of wireless charging devices connected in a row. The wireless charging devices 200 are connected in parallel. The circuit failure of one of them will not affect other charging devices. The number of the wireless charging devices 200 connected in a row may be increased or decreased according to the actual need, or even only one wireless charging device 200 is arranged. When only one wireless charging device 200 is arranged, no connecting rod 210 is needed.

A backing plate 201 is disposed on each wireless charging device. Preferably, the backing plate 201 may be fixed on wall surface by screw or pasting or by other means. A main circuit board of the wireless charging device 200 is arranged in the backing plate 201, and a charge lamp 202 is disposed on the backing plate 201. When the integrated intelligent head-mounted device is being charged, the charge lamp 202 gives out light so that the worker knows if the wireless charging device is in a charging state or not.

A wireless charging transmission plate 205 stretching in a horizontal direction is disposed on one side of the backing plate 201. The backing plate 201 and the wireless charging transmission plate 205 form a shape of hook. The helmet 101 may be hung on the wireless charging transmission plate 205, as shown in FIG. 19 and FIG. 21. In this way, the wireless charging transmission plate 205 may send wireless signals to the helmet 101. After the helmet 101 receives a wireless signal, it will use this wireless signal for charging. As the helmet 101 is directly hung on the wireless charging transmission plate 205, it is very close to the wireless charging transmission plate 205, or contacts the wireless charging transmission plate 205 to ensure the helmet 101 can sufficiently receive the wireless signals sent by the wireless charging transmission plate 205.

In order that the helmet 101 is more firmly hung on the wireless charging transmission plate 205, one round of rubber rings 207 are arranged on the wireless charging transmission plate 205 to raise the friction between the helmet 101 and the wireless charging transmission plate 205. Moreover, a charging interface 206 is disposed on one side of the backing plate 201, and an external power supply may supply power to the wireless charging device via the charging interface 206. In this way, as long as a worker hangs his helmet 101 on a wireless charging transmission plate 205, charging of the integrated intelligent head-mounted device can be realized automatically.

Lastly, it should be stressed that the present invention is not limited to the foregoing embodiments, and the modifications to the structures of various sensors disposed on the external endless belt or internal frame and the modifications to the shapes of the internal frame and external endless belt for instance should also be in the protection scope of the claims of the present invention.

The invention claimed is:

1. An integrated intelligent head-mounted device comprising:
   a frame mounted on a helmet in a detachable manner, on which a control circuit, a safety detection sensor, a loudspeaker, a microphone and a power supply are disposed or mounted; and a health detection sensor disposed in the helmet;
   wherein the frame comprises an internal frame disposed inside the helmet and an external endless belt which is formed a loop outside the helmet; and the health detection sensor is disposed on a head band of the helmet; and wherein a first fastener is disposed on the external endless belt, a second fastener coordinating with the first fastener is disposed on the internal frame, and the internal frame and the external endless belt are connected to the second fastener in a fixed manner via the first fastener; and
   the control circuit is provided with a wireless communication module and a positioning module and electrically connected to the health detection sensor, the video camera, the safety detection sensor, the loudspeaker, the microphone and the power supply.

2. The integrated intelligent head-mounted device according to claim 1, wherein one of the first fastener and the second fastener is an elastic buckle and the other is a jack.

3. The integrated intelligent head-mounted device according to claim 2, wherein the integrated intelligent head-mounted device further comprises a retaining ring, which is mounted outside the elastic buckle in a sleeved manner after the elastic buckle is coupled with the jack.

4. The integrated intelligent head-mounted device according to claim 1, wherein a video camera is further disposed on the external endless belt, which is mounted on the external endless belt in a detachable manner and electrically connected to the control circuit.

5. The integrated intelligent head-mounted device according to claim 1, wherein the external endless belt comprises an endless belt body and an integration module, which is integrated with the endless belt body or is fixed onto the endless belt body in a detachable manner.

6. The integrated intelligent head-mounted device according to claim 5, wherein at least one of the inner microphone and the loudspeaker is disposed on the integration module.

7. The integrated intelligent head-mounted device according to claim 5, wherein a vibrator is further disposed on the integration module, which sends out vibration signals under the control of signals outputted by the control circuit.

8. The integrated intelligent head-mounted device according to claim 1, wherein a display device is mounted on the internal frame in a detachable manner and electrically connected to the control circuit, in which the display device comprises a holder comprising a first portion secured on the internal frame and a second portion, and a display screen mounted on the second portion of the holder.

9. The integrated intelligent head-mounted device according to claim 8, wherein the first portion comprises a sliding seat mounted on the internal frame and a sliding block that may slide relative to the sliding seat; and wherein the second portion is articulated with the sliding block.

10. The integrated intelligent head-mounted device according to claim 1, wherein the power supply is mounted on rear side of the internal frame and connected to front side of the internal frame via a flexible conductor.

11. The integrated intelligent head-mounted device according to claim 10, wherein the integrated intelligent head-mounted device is further provided with a battery temperature sensor for detecting temperature of the power supply and outputting detection signals to the control circuit.

12. The integrated intelligent head-mounted device according to claim 1, wherein a charging interface is disposed on the external endless belt for charging the power supply.

13. The integrated intelligent head-mounted device according to claim 1, wherein at least one control button electrically connected to the control circuit is disposed on the external endless belt.

14. The integrated intelligent head-mounted device according to claim 1, wherein the external endless belt comprises at least one integration module; and wherein the control circuit, the power supply and the safety sensor are disposed inside the integration module, and a first flexible conductor electrically connected to the control circuit is disposed inside the external endless belt.

15. The integrated intelligent head-mounted device according to claim 14, wherein ends of the external endless belt are coupled with each other to externally encircle the helmet; and a containing chamber coordinating with the integration module is disposed on the external endless belt to contain the integration module.

16. The integrated intelligent head-mounted device according to claim 14, wherein an elastic buckle passing through a jack disposed on the helmet is disposed on the external endless belt, and elastic buckle is locked by a retaining ring after passing through the jack.

17. The integrated intelligent head-mounted device according to claim 16, wherein the health detection sensor is mounted on a head band of the helmet; and the elastic buckle is provided with a power board coupled with flexible wires for electrical connection between the elastic buckle and the wires; and wherein the head band is provided with a second flexible conductor electrically connected to the flexible wires.

18. The integrated intelligent head-mounted device according to claim 14, wherein the number of integration modules is two or more, including a first integration module and a second integration module; a video camera being disposed on the first integration module in a detachable manner; a display device being mounted on the second integration module in a detachable manner.

19. The integrated intelligent head-mounted device according to claim 14, wherein at least one control button is disposed on the frame, which is electrically connected to the control circuit.

\* \* \* \* \*